(12) United States Patent
Parker et al.

(10) Patent No.: US 10,102,666 B2
(45) Date of Patent: Oct. 16, 2018

(54) ELECTRONIC DISPLAY STABILIZATION FOR HEAD MOUNTED DISPLAY (71) Applicant: Google Inc., Mountain View, CA (US)

(72) Inventors: Evan Hardesty Parker, Los Altos, CA (US); Johnny Chung Lee, Mountain View, CA (US); Adrian Wong, Mountain View, CA (US)

(73) Assignee: GOOGLE LLC, Mountain View, CA (US)

(*) Notice: Subject to any disclaimer, the term of this patent is extended or adjusted under 35 U.S.C. 154(b) by 0 days.

(21) Appl. No.: 15/180,819

(22) Filed: Jun. 13, 2016

(65) Prior Publication Data
US 2016/0364904 A1 Dec. 15, 2016

Related U.S. Application Data (60) Provisional application No. 62/174,602, filed on Jun. 12, 2015.

(51) Int. Cl.
G06T 15/20 (2011.01)
G06F 3/038 (2013.01)
G06F 3/01 (2006.01)
G02B 27/00 (2006.01)
G06T 3/00 (2006.01)
G02B 27/01 (2006.01)

(52) U.S. Cl.
CPC ........ *G06T 15/205* (2013.01); *G02B 27/0093* (2013.01); *G02B 27/017* (2013.01); *G06F 3/012* (2013.01); *G06F 3/038* (2013.01); *G06T 3/0093* (2013.01)

(58) Field of Classification Search
CPC . G06T 19/006; G02B 27/017–27/0176; G02B 2027/0174; G02B 2027/0178
See application file for complete search history.

(56) References Cited

U.S. PATENT DOCUMENTS

| 5,627,905 | A | 5/1997 | Sebok et al. |
|---|---|---|---|
| 6,480,615 | B1 | 11/2002 | Sun et al. |
| 7,724,258 | B2 | 5/2010 | Ebert et al. |
| 8,773,448 | B2 | 7/2014 | Lalonde et al. |
| 8,823,746 | B2 | 9/2014 | Jones et al. |
| 2006/0087509 | A1 | 4/2006 | Ebert et al. |

(Continued)

OTHER PUBLICATIONS

U.S. Appl. No. 62/174,602, filed Jun. 12, 2015, listing Evan Hardesty Parker et al. as inventors, entitled "Electronic Display Stabilization for Head Mounted Display,".

(Continued)

*Primary Examiner* — Daniel Hajnik (57) ABSTRACT

A method includes determining, at a first time, a representation of a first head rotation of a head mounted display (HMD) using a first inertial sensor sample stream and rendering, at an application processor, a texture based on the first head rotation. The method further includes determining, at a second time subsequent to the first time, a representation of a second head rotation of the HMD using a second inertial sensor sample stream having a higher sampling rate than the first inertial sensor sample stream, and generating, at a compositor, a rotated representation of the texture based on a difference between the first head rotation and the second head rotation.

8 Claims, 5 Drawing Sheets (56) References Cited

U.S. PATENT DOCUMENTS

| | | | |
|---|---|---|---|
| 2006/0244757 A1 | 11/2006 | Fang et al. | |
| 2008/0001963 A1 | 1/2008 | Lefebvre et al. | |
| 2012/0223833 A1* | 9/2012 | Thomas | G06F 19/3418 340/539.12 |
| 2014/0176591 A1* | 6/2014 | Klein | G09G 3/003 345/589 |
| 2014/0267350 A1 | 9/2014 | Kass et al. | |
| 2014/0362113 A1 | 12/2014 | Benson et al. | |
| 2015/0262336 A1 | 9/2015 | Jin et al. | |
| 2015/0310665 A1 | 10/2015 | Michail et al. | |
| 2016/0189429 A1* | 6/2016 | Mallinson | G02B 26/10 345/633 |
| 2016/0282619 A1 | 9/2016 | Oto | |

OTHER PUBLICATIONS

Oculus VR, LLC, Blog—Asynchronous Timewarp Examined, Posted by Michael Antonov, <http://developer.oculus.com/blog/asynchronous-timewarp-examined/>, Accessed Oct. 22, 2015, 11 pages.

Valve Software, Blog—Down the VR Rabbit Hole: Fixing Judder, Posted by Michael Abrash, <http://blogs.valvesoftware.com/abrash/down-the-vr-rabbit-hole-fixing-judder/>, Accessed Oct. 22, 2015, 32 pages.

Daniel Weiskopf, et al., "A Case Study on Hardware-Accelerated Langrangian-Eulerian Texture Advection for Flow Visualization," Visualization and Interactive Systems Group, University of Stuttgart, Germany and School of Computational Science and Information Technology, Florida State University, 4 pages.

Valve Software, Blog—Why Virtual Isn't Real to Your Brain, Posted by Michael Abrash, <http://blogs.valvesoftwarwe.com/abrash/why-virtual-isn't-real-to-your-brain/>, Accessed Oct. 22, 2015, 21 pages.

International Search Report and Written Opinion correlating to PCT/US2016/037203 dated Sep. 21, 2016, 45 pages.

Didier, et al., "A Time Delay Compensation Method Improving Registration for Augmented Reality", Robotics and Automation, Apr. 18, 2005, 6 pages.

Mark, et al., "Post-rendering 3D warping", Proceedings of the 1997 Symposium on Interactive 3D Graphics, Jan. 1, 1997, 10 pages.

Azuma, et all., "Improving Static and Dynamic Registration in an Optical See-Through HMD", SIGGRAPH Conference Proceedings, Jan. 1, 1994, 17 pages.

U.S. Appl. No. 14/946,983, filed Nov. 20, 2015, listing Craig Donner, et al. as inventors, entitled "Electronic Display Stabilization Using Pixel Velocities".

International Search Report and Written Opinion correlating to PCT/US2016/055528 dated Jan. 11, 2017, 9 pages.

International Preliminary Report on Patentablity dated Dec. 21, 2017 for PCT Application No. PCT/US2016/037203, 8 pages.

Corrected Notice of Allowability dated Mar. 30, 2018 for U.S. Appl. No. 14/943,983, 13 pages.

Notice of Allowance dated Mar. 19, 2018 for U.S. Appl. No. 14/943,983, 10 pages.

Non-Final Office Action dated Nov. 17, 2017 for U.S. Appl. No. 14/946,983, 40 pages.

International Preliminary Report on Patentability dated May 31, 2018 for PCT Application No. PCT/US2016/055528, 7 pages.

* cited by examiner

ELECTRONIC DISPLAY STABILIZATION FOR HEAD MOUNTED DISPLAY

CROSS-REFERENCE TO RELATED APPLICATIONS

The present application claims priority to U.S. Patent Application No. 62/174,602, entitled "ELECTRONIC DISPLAY STABILIZATION FOR HEAD MOUNTED DISPLAY" and filed Jun. 12, 2015, the entirety of which is incorporated by reference herein.

FIELD OF THE DISCLOSURE

The present disclosure relates generally to head mounted display systems and more particularly to reduced-latency motion compensation and stabilization in head mounted display systems.

BACKGROUND

A virtual reality (VR) system replicates an environment that simulates physical presence in places in the real world or an imagined world using entirely-computer-generated three-dimensional (3D) imagery of "scenes" within this world. Similarly, an augmented reality (AR) system "augments" physical presence in the real world through computer-generated 3D imagery that overlies contemporaneously captured imagery of the real world. Thus, VR and AR systems both seek to provide an accurate sense of "presence" in the real, augmented, or imagined world. Typically, this sense of presence is facilitated through the use of a head mounted display (HMD) that provides separate left-eye and right-eye displays. The displays together present a stereoscopic, or 3D, representation of a scene in the represented world, where the presented scene reflects the user's relative perspective of the scene based on the user's current pose (that is, the location and orientation of the user's head relative to a reference coordinate frame for the depicted scene).

HMD-based VR and AR systems display 3D imagery as a sequence of display frames, each display frame rendered based on a corresponding detected head pose and persisting for a particular period of time. However, as an HMD generally permits a user to move freely about, the user's head may have significantly rotated in the time between the initiation of the rendering of a frame and the display of the resulting rendered frame. As such, the imagery displayed at the HMD at a particular point in time may lag behind the user's head movements. This dissonance between the user's perceived orientation within a scene and the orientation of the perspective of the scene presented on the HMD can lead to user disorientation, or what is often referred to as "virtual reality sickness". Thus, to reduce or eliminate user disorientation and thereby provide improved presence, HMD-based VR and AR systems seek to minimize the motion-to-photon latency; that is, the latency between user head/eye movement and when photons representing a scene from in the resulting new pose hit the user's eye.

BRIEF DESCRIPTION OF THE DRAWINGS

The present disclosure may be better understood by, and its numerous features and advantages made apparent to, those skilled in the art by referencing the accompanying drawings. The use of the same reference symbols in different drawings indicates similar or identical items.

DETAILED DESCRIPTION

The following description is intended to convey a thorough understanding of the present disclosure by providing a number of specific embodiments and details involving HMD-based AR and VR display systems. It is understood, however, that the present disclosure is not limited to these specific embodiments and details, which are examples only, and the scope of the disclosure is accordingly intended to be limited only by the following claims and equivalents thereof. It is further understood that one possessing ordinary skill in the art, in light of known systems and methods, would appreciate the use of the disclosure for its intended purposes and benefits in any number of alternative embodiments, depending upon specific design and other needs.

Figure 1:
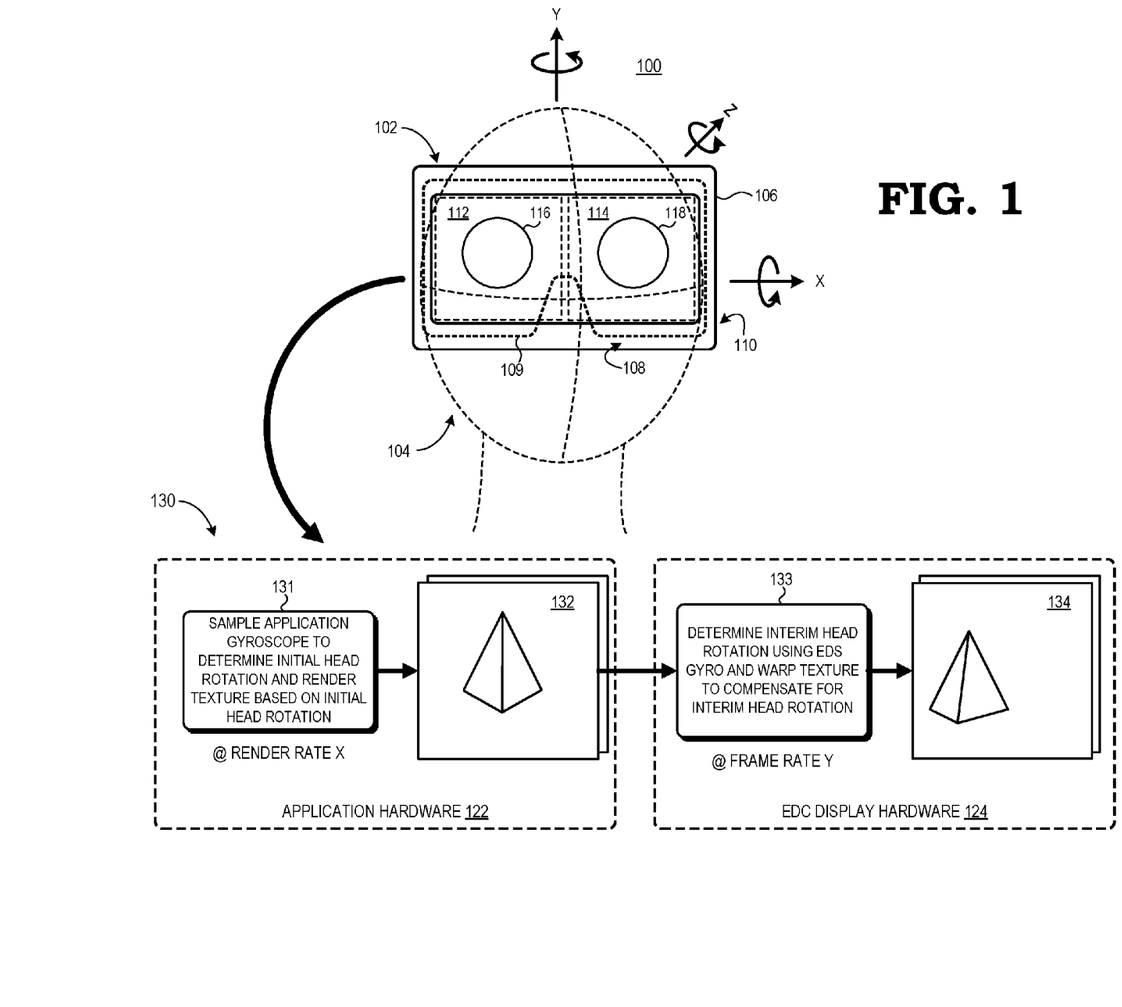
FIG. 1 is a diagram illustrating a head mounted display (HMD) system implementing electronic display stabilization (EDS) in accordance with at least one embodiment of the present disclosure.

FIG. 1 illustrates an HMD-based display system 100 for providing VR or AR presence in the real world or an imagined world in accordance with at least one embodiment of the present disclosure. The display system 100 includes an HMD 102 coupled to the movements of a user's head 104. Typically, as implied by the term "mounted" in "head mounted display" the HMD 102 includes an apparatus strapped to, or otherwise mounted on, the user's head 104 such that the HMD 102 is fixedly positioned in proximity to the user's face and thus moves with the user's movements. However, in some circumstances a user may hold a tablet computer or other hand-held device up to the user's face and constrain the movement of the hand-held device such that the orientation of the hand-held device to the user's head is relatively fixed even as the user's head 104 moves. In such instances, a hand-held device operated in this manner also may be considered an implementation of the HMD 102 even though it is not "mounted" via a physical attachment to the user's head 104.

The HMD 102 comprises a housing 106 having a surface 108 opposite another surface 110, as well as a face gasket 109 and set of straps or a harness (omitted from FIG. 1 for clarity) to mount the housing 106 on the user's head 104 so that the user faces the surface 108 of the housing 106. In the depicted embodiment, the HMD 102 is a binocular HMD and thus has a left-eye display 112 and a right-eye display 114 disposed at the surface 108. The displays 112, 114 may be implemented as separate display devices (that is independent display arrays driven by separate display driver hardware components) or the displays 112, 114 may be implemented as logically-separated regions of a single display device (e.g., a single display array logically divided into left and right "halves"). The housing 106 further includes an eyepiece lens 116 aligned with the left-eye display 112 and an eyepiece lens 118 aligned with the right-eye display 114.

Alternatively, in some embodiments, the HMD 102 may be implemented as a monocular HMD in that a single image is presented to both eyes of the user, either through left and right eyepiece lenses 116, 118, or directly without an intervening lens.

As described in greater detail below, the display system 100 further includes an imagery rendering system to generate imagery for display at the HMD 102. In some embodiments, the components of the imagery rendering system are primarily implemented within the HMD 102 itself. For example, the HMD 102 may comprise the computing system that executes the VR/AR application and renders the resulting imagery, and the HMD 102 may be connected through a wireless or wired connection to a local or remote computing device that provides various data associated with the VR/AR application, such data describing objects to be rendered in a scene, the parameters of other users (e.g., location) operating in the same world space, and the like. In other embodiments, some or all of the components of the image rendering system are implemented external to the HMD 102, and the data representing the imagery for display may be supplied to the HMD 102 via a wired or wireless connection.

In operation, the display system 100 executes a VR or AR application that determines the current pose (that is, position and rotational orientation) of the HMD 104 (and thus the user's head 104) relative to a reference coordinate frame and then generates imagery of a scene from a perspective associated with that pose. The displayed imagery may be completely computer-generated (that is, VR imagery), or the imagery may be a combination of imagery captured of the local environment (e.g., imagery captured via one or more image sensors mounted on the HMD 102) and an AR overlay that is rendered so as to reflect the current user pose. As shown in FIG. 1, in implementations with both a left-side display and a right-side display, left-eye-specific imagery may be rendered and displayed in the left-eye display 112 concurrent with the rendering and display of right-eye-specific imagery in the right-eye display 114, thereby enabling a stereoscopic 3D display of scene represented by the displayed imagery.

As the HMD 102 is mounted on the user's head 104, or otherwise constrained so as to move in concert with the user's head, the HMD 102 is subject to considerable rotation around one or more axes (e.g., the depicted x, y, and z axes) during operation. As described above, this rotation, when combined with the rendering and display latency of the display system 100, can result in substantial user disorientation unless otherwise mitigated. To this end, the display system 100 utilizes an electronic display stabilization (EDS) process to warp an image before its display to compensate for user head rotation that has occurred since the image was originally rendered, and thus stabilize the image when viewed through a lens of the HMD 102. In at least one embodiment, the EDS process is based on a decoupling of the application processor and other hardware used to render the original texture (referred to herein as "application hardware 122") and the hardware used to warp the texture and display the resulting warped display frame (referred to herein as the "EDS display hardware 124"). In addition, this decoupling further may be provided through the use of a gyroscope or other inertial sensor by the EDS display hardware 124 that is separate from the gyroscope or other inertial sensor used by the application hardware 122, or through the sampling of the same gyroscope at different rates for each of the EDS display hardware 124 and the application hardware 122.

Diagram 130 of FIG. 1 summarizes the EDS process employed by the EDS display hardware 124 in accordance with at least one embodiment. As illustrated by block 131, the application hardware 122 samples its inertial sensor to determine an initial head pose and initial head rotation, and renders a respective texture 132 (also commonly referred to as a "frame" or an "image") for each of the displays 112, 114 based on the determined initial head pose and rotation. The resulting pair of textures 132 together represent a view of a 3D scene at a corresponding point in time. The application hardware 122 provides to the EDS display hardware 124 the rendered pair of textures 132, a representation of the determined initial head rotation, and a timestamp representing the point in time at which the head rotation was determined (e.g., when the last sensor sample used to determine the initial head rotation was received). This rendering process is performed at a texture rendering rate denoted herein as "rendering rate X".

Independently, the EDS display hardware 124 operates to generate and scan out one or more display frames for display at each of the displays 112, 114 based on the corresponding rendered texture 132 at a display rate denoted herein as "display frame rate Y." However, because of the latency in the rendering the texture 132 and other processing of the texture 132 in preparing it for display, it is likely that the user's head 104 has perceptibly rotated from the pose used by the application hardware 122 to render the texture 132. That is, by the time the texture 132 has been rendered and made ready, it may be "stale" in that the head orientation it represents is no longer the current orientation of the user's head 104. Thus, as illustrated by block 133, in preparation for scan out of a next display frame (e.g., assertion of a vsync signal), the EDS display hardware 124 accesses the EDS inertial sensor to determine an updated head rotation that represents the most current head rotation, and from this updated head rotation determines an interim head rotation, that is, the head rotation that has occurred since the application hardware 122 initiated rendering of the texture 132. The EDS display hardware 124 then warps each texture 132 based on this interim head rotation to generate an interim-rotation-compensated warped texture 134, which may be scanned out to the corresponding display 112, 114 as a displayed image or frame.

In at least one embodiment, the warping process employed by the EDS display hardware 124 includes the determination, based on the interim head rotation, of a homography rotation from the original head rotation as determined by the application hardware 122 and the updated head rotation as determined by the EDS display hardware 124, and the application of this homography rotation (in the form of a linear transform) to the texture 132 to generate the warped, or modified, texture 134. Further, the eyepiece lenses 116, 118 may introduce optical distortion, as well as chromatic aberrations, or color separation, due to different wavelengths of light separating when refracted through the eyepiece lenses, and thus the warping process employed by the EDS display hardware 124 may compensate for one or more of optical distortion, chromatic aberrations, darkening toward the edges of the lenses, composite textures from other sources, and the like. As described in greater detail below, the interim warping provided by the homography rotation may be implemented by applying the homography rotation to the look-up table (LUT) values utilized by the distortion/chromatic aberration correction processes to introduce compensatory distortion (or "predistortion"), and then applying the resulting modified LUT values to the texture 132 so as to concurrently implement both the homography rotation and the other correction/compensation processes.

The use of separate gyroscopes or other inertial sensors by the application hardware 122 and the EDS display hardware 124, or the use of different sampling rates of the same inertial sensor for the application hardware 122 and the EDS display hardware 124, permits the application hardware 122 and the EDS display hardware 124 to operate substantially independently, while reducing motion-to-photon latency in view of substantial head rotation. This independence in turn permits the application hardware 122 to render textures 132 at a render rate X that is less than the display frame rate Y of the EDS display hardware 124 (that is, X<Y). As such, the application hardware 122 may operate a lower performance state, and thus reduce power consumption and heat generation by the display system 100, or the EDS display hardware 124 may display frames at a rate greater than a rate at which the application hardware 122 can render textures. To illustrate, assume the application hardware 122 is operated at a performance state whereby textures are rendered at a rate of 60 frames/second (or 60 Hertz) (that is, render rate X=60 Hz). At this rate, a texture is rendered every 16.67 milliseconds (ms). However, at a head rotation rate of, for example, 100 degrees/second, the user's head may have rotated 1.6 degrees in the 16 ms interim, and thus an object at arm's length in the scene represented by the rendered texture may be noticeably "offset" by approximately 2.8 centimeters, or about a thumb's width, from where the user would have otherwise perceived it to be based on the user's current head pose. However, assuming the EDS display system 124 is operating to display frames at a rate of 120 frames/second (that is, display frame rate Y=120 Hz), two display frames may generated from the same texture, with one display frame warped based on an interim head rotation detected at 8 ms from the time that the texture was rendered, and the second display frame warped based on a subsequent interim head rotation detected 8 ms thereafter. Assuming, again, a head rotation rate of 100 degrees/second, the "unaccounted for" head rotation would be only 0.8 degrees at most, and thus lead to a potential offset of only 1.4 cm at most between the position of an object at arm's length represented in the displayed frame and the position as the user would have otherwise perceived it based on the current pose of the user's head 104.

In addition to permitting the application hardware 122 and the EDS display hardware 124 to operate at different rates, the decoupling of the application hardware and the EDS display hardware also permits the display system 100 to more readily recover from dropped frames by the application hardware 122. This is because the EDS display hardware 124 can compensate for a dropped texture 132 by continuing to warp the previous texture 132 for new display frames based on head rotation updates determined from the EDS inertial sensor.

In many implementations, the displays 112, 114 comprise display devices that operate on a raster-scan basis. That is, lines of pixel data are scanned in and displayed sequentially in what is typically referred to as "raster scan order." In most raster scan displays, scan out typically initiates with the top row of pixels and scans down to the bottom row of pixels. As with rendering of a texture and subsequent processing of the texture for display, this raster scan process introduces latency that negatively impacts the motion-to-photon latency. To illustrate, at a display rate of, for example, 60 Hz, in a worst case scenario a display system may take 16 ms to complete scan out of a display frame, with the last row being scanned out approximately 16 ms after the top row. Thus, this scan out latency may introduce positional dissonance to the user, particularly for objects represented in the rows toward the bottom of the frame. This effect is particularly pronounced in implementations of the HMD 102 that incorporate a device that normally operates in a portrait orientation and which is incorporated into for the HMD 102 by reorienting the device into a landscape orientation (e.g., by repurposing a computing-enabled cellular phone turned on its side, such as found in the Google Cardboard VR headset). In such instances, the raster scan order then runs horizontally, which is also the direction in which the most head rotation is likely to occur, and thus exacerbating the motion-to-photon latency effect.

Thus, to compensate for the scan out delay in implementations of the HMD 102 utilizing raster scan displays, in at least some embodiments the EDS process described above may be performed on a per-slice basis, where each slice represents a subset of one or more of the scan lines of the display frame. That is, as each slice is processed in sequence for display, the EDS display hardware 124 may determine an updated head rotation for that slice, determine a new homography rotation based on the updated head rotation for that slice, and apply the new homography rotation to the slice to warp the portion of the display frame represented by that slice. In this manner, the impact due to head rotation and the latency due to raster scan out order may be mitigated by warping each slice by an interim head rotation that is more closely aligned with the actual point in time that the slice is displayed to the user.

Because the EDS display hardware 124 determines updated head rotations at a higher frequency than the application hardware 122 determines head rotations, in at least one embodiment the EDS display hardware 124 implements a gyroscope (or other inertial sensor) that has a sampling frequency (e.g., 1 kHz or more) significantly greater than the sampling frequency (e.g., 100-400 Hz) of the gyroscope (or other inertial sensor) used by the application hardware 122, and thus providing the EDS display hardware 124 with the improved rotation resolution needed to more finely determine the most recent head rotation of the HMD 102 when operating to rotation warp a rendered texture for display. Alternatively, a single gyroscope may be implemented, whereby the sensor state of this gyroscope is sampled at a rate X to generate a first sample stream for the application hardware 122 and further is sampled at a rate Y (Y>X) to generate a second sample stream for the EDS display hardware 124. Thus, reference to two separate gyroscopes or other inertial sensors also may be a reference two sample streams from the same gyroscope or other inertial sensor but having different sample rates.

Figure 2:
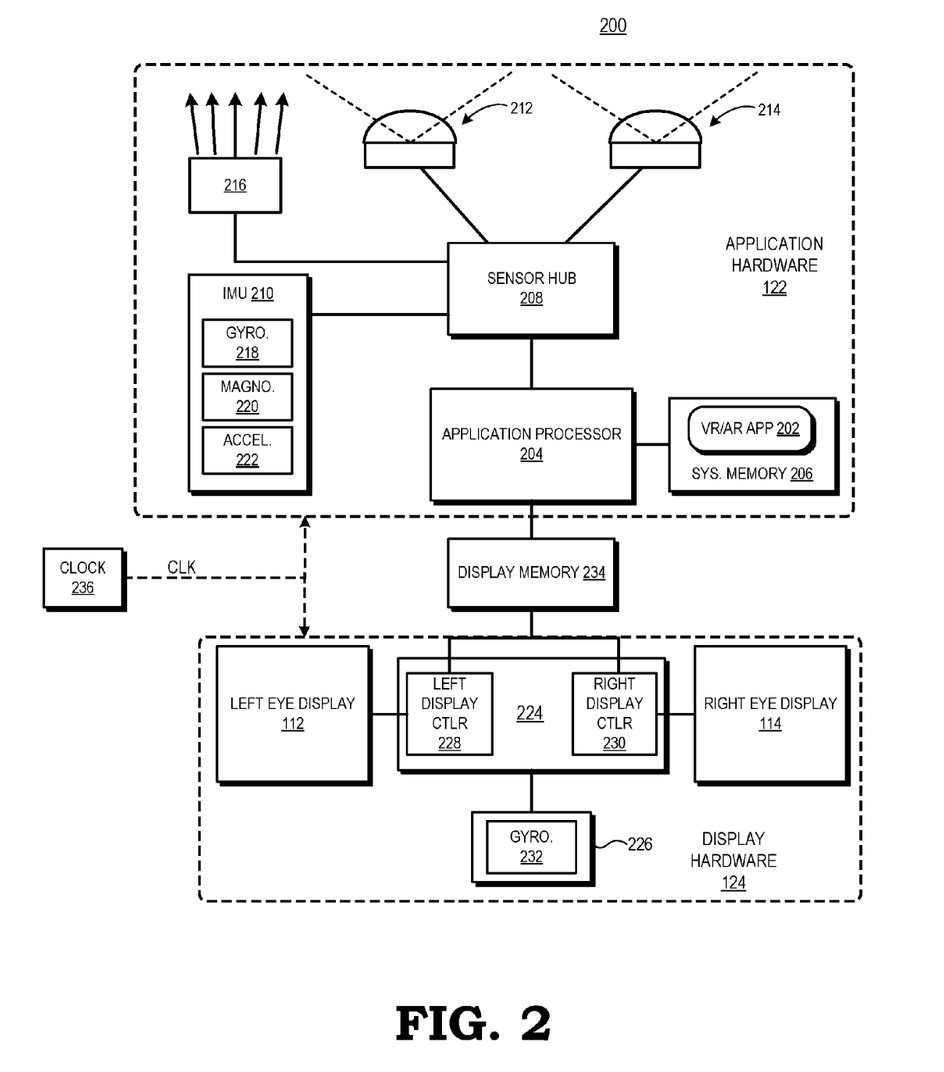
FIG. 2 is a block diagram illustrating a hardware configuration of the HMD system of FIG. 1 in accordance with at least one embodiment of the present disclosure.

FIG. 2 illustrates an example hardware configuration 200 of an image rendering and display system of the display system 100 of FIG. 1 in accordance with at least one embodiment of the present disclosure. As noted above, the hardware configuration 200 includes application hardware 122 directed to the execution of a VR or AR application (referred to herein as "VR/AR application 202") so as to render VR or AR content representing scenes from current poses of the user's head 104 or the HMD 102, the VR or AR content comprising a sequence of textures for each eye. The hardware configuration 200 further includes the EDS display hardware 124 directed to the display of the VR or AR content represented by the sequence of textures, wherein the EDS display hardware 124 implements an EDS process to as to compensate for interim head rotation between rendered textures.

In the depicted example, the hardware configuration 200 includes an application processor 204, a system memory 206, a sensor hub 208, and an inertial management unit 210. In some embodiments, the HMD 102 may incorporate image capture for purposes of visual localization or visual telemetry, or for real-time display of imagery captured of the local environment in support of AR functionality. In such embodiments, the hardware configuration 200 further may include, for example, one or more image sensors 212, 214 and a structured-light or time-of-flight (ToF) depth sensor 216.

The application IMU 210 comprises one or more inertial sensors to facilitate tracking of the pose of the HMD 102, including, for example, a gyroscope 218, a magnetometer 220, and an accelerometer 222. The Sensortec™ BMI160 from Bosch Gmbh is an example of a commercially-available implementation of the IMU 210. The sensor hub 208 is coupled to the IMU 210, the imaging sensors 212, 214, and the depth sensor 216, and operates to manage the transfer of control signaling and data between the application processor 204 and the IMU 210, the imaging sensors 212, 214, the depth sensor 216, and other sensors of the display system 100. The Myriad™ 2 vision processing unit (VPU) from Movidius Ltd. is an example of a commercially-available implementation of the sensor hub 208. The application processor 204 comprises one or more central processing units (CPUs), graphics processing units (GPUs), or a combination of one or more CPUs and one or more GPUs. The Snapdragon™ 810 MSM8994 system-on-a-chip (SoC) from Qualcomm Incorporated is an example of a commercially-available implementation of the application processor 204.

In the depicted example, the EDS display hardware 124 includes a compositor 224, the left-eye display 112, the right-eye display 114, and an EDS IMU 226. The compositor 224 is a hardware device that may be implemented as, for example, an ASIC, programmable logic, or a combination thereof, and includes a left display controller 228 for driving the left eye display 112 and a right display controller 230 for driving the right eye display 114. The EDS IMU 226 includes one or more inertial sensors for tracking the head rotation of the HMD 102 for the EDS display hardware 124, such as a gyroscope 232. As noted above, rather than implementing two separate gyroscopes 218, 232, a single gyroscope may be sampled at different sampling rates to generate two different sample streams, one serving as the gyroscope 218 and the other serving as the gyroscope 232, in which event reference to the gyroscope 218 is a reference to a first sample stream generated from this single gyroscope, and reference to the gyroscope 232 is a reference to a second sample stream also generated from this single gyroscope, although at a higher sample rate.

In operation, the application processor 204 executes the VR/AR application 202 (stored in, for example, the system memory 206) to provide VR/AR functionality for a user. As part of this process, the VR/AR application 202 manipulates the application processor 204 to render a sequence of textures (e.g., textures 132 of FIG. 1) for each eye at the render rate X. Each texture contains visual content that is either entirely computer generated or visual content that is a combination of captured imagery (via the imaging sensors 212, 214) and a computer-generated overlay. The visual content of each texture represents a scene from a corresponding pose of the user's head (or pose of the HMD 102) at the time that the texture is determined. Thus, in preparation for rendering each texture, the application processor 204 obtains the current samples from the gyroscope 218, the magnetometer 220, and the accelerometer 222 of the IMU 210 and determines the current pose and rotation of the user's head from these inertial sensor readings. Instead of, or in addition to, using the IMU 210 for determining the current pose and rotation, the application processor 204 may use the information from one or more imaging sensors or depth sensors to determine, verify, or revise the current pose and rotation using one or more visual telemetry or simultaneous localization and mapping (SLAM) techniques. From the determined head pose, the application processor 204 renders a pair of textures that together represent the stereoscopic view of the scene from the determined head orientation and rotation. The pair of rendered textures is then stored in a frame buffer implemented in a display memory 234, which may be part of the system memory 206 or a separate graphics memory.

In parallel, the compositor 224 operates to generate display frames based on rendered textures and drive the displays 112, 114 based on the generated display frames. As part of this process, the compositor 224 implements an EDS process to determine an interim head rotation and warp the pair of textures based on the interim head rotation so as to generate a pair of display frames that are more closely aligned with the actual head pose at the time that the display frames are displayed at the displays 112, 114.

As described in greater detail below with reference to FIGS. 3-5, in some embodiments the compositor 224 determines an interim head rotation based on a difference between an initial head rotation determined by the application processor 204 from samples from the gyroscope 218 and an updated head rotation determined by the compositor 224 from samples from the gyroscope 232. As such, in some embodiments the gyroscope 218 and the gyroscope 232 are precisely calibrated so that they register similar rotations for a given rotational movement by the HMD 102. Moreover, to help ensure that the gyroscopes 218, 232 are precisely synchronized, and thus their respective sensor samples can be temporally correlated, in at least one embodiment the hardware configuration 200 includes a synchronization mechanism in the form of, for example, a clock reference 236 that distributes a common clock signal (denoted "CLK") among the components of the application hardware 122 and the EDS display hardware 124.

Figure 3:
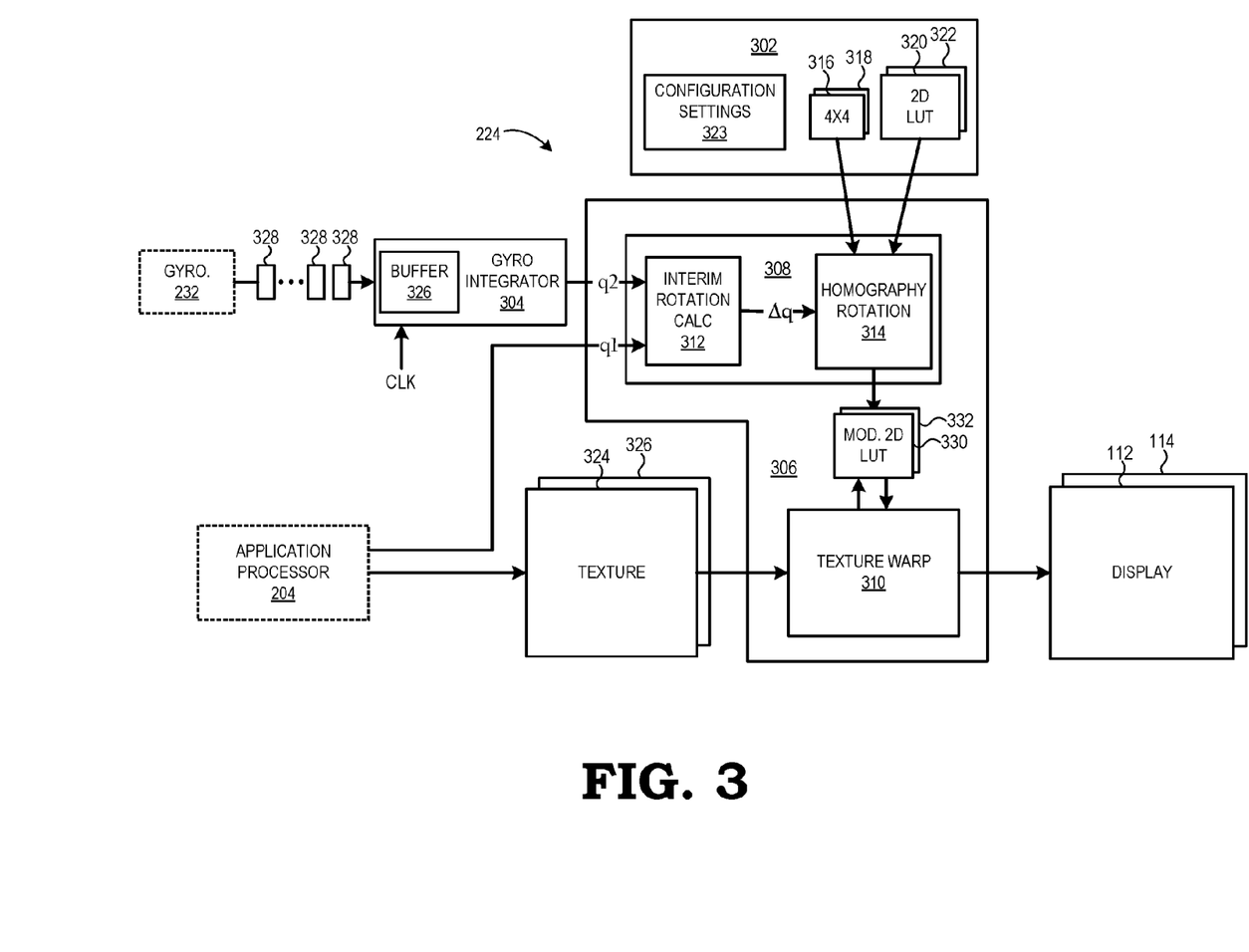
FIG. 3 is a block diagram illustrating a compositor of the HMD system of FIG. 2 in greater detail in accordance with at least one embodiment of the present disclosure.

FIG. 3 illustrates an example implementation of the EDS display hardware 124 in accordance with at least one embodiment of the present disclosure. In the depicted example, the compositor 224 of the EDS display hardware 124 includes a configuration store 302, an integrator component 304, and a display controller 306 (which represents either of the display controllers 228, 230 of FIG. 2). The display controller 306 includes an interim rotation transform component 308 and a texture warp component 310. The interim rotation transform component 308 may include an interim rotation calculation component 312 and a homography rotation component 314. The operations of these components are described in greater detail below.

Figure 4:
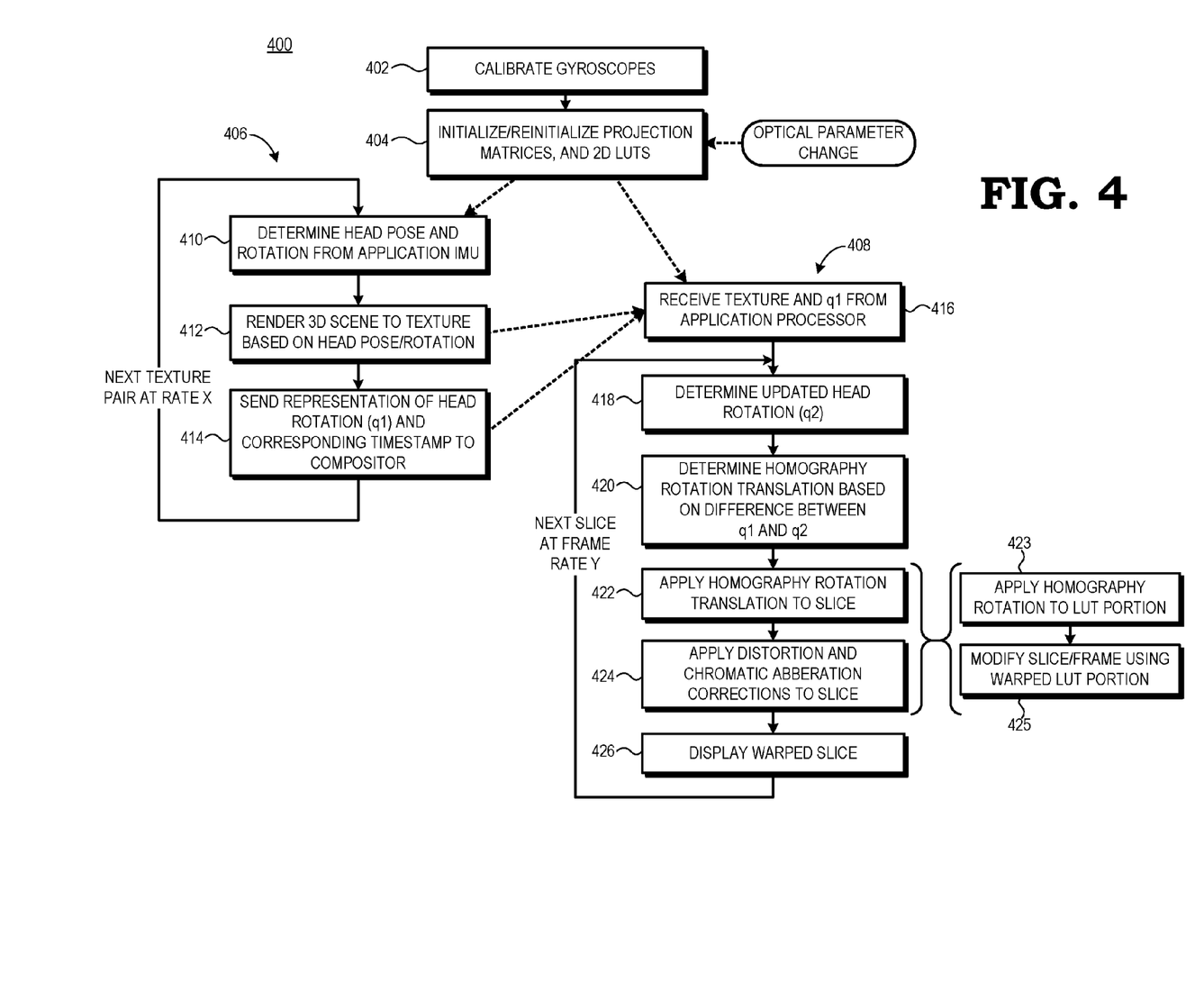
FIG. 4 is a flow diagram illustrating an example EDS process in accordance with at least one embodiment of the present disclosure.
Figure 5:
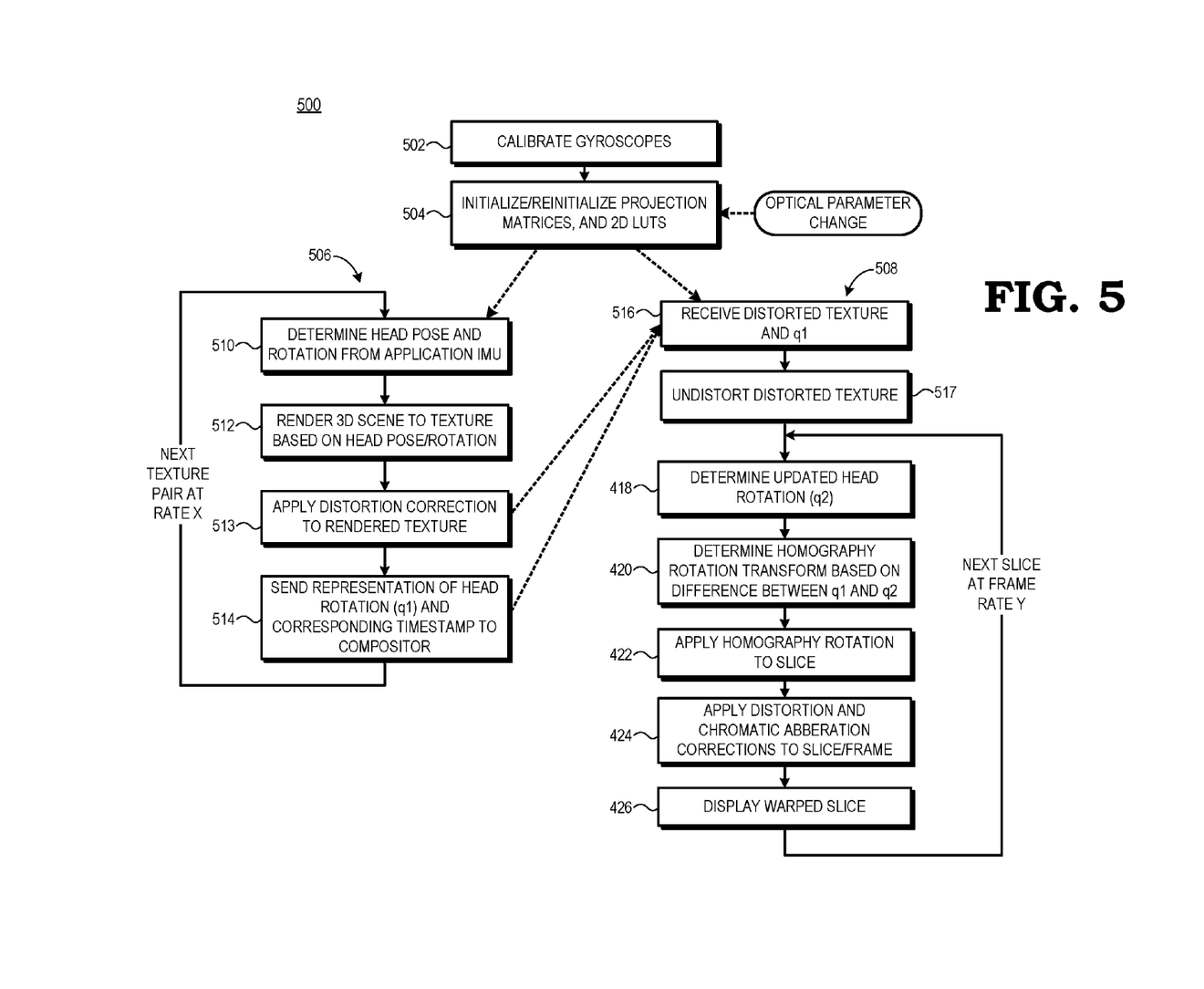
FIG. 5 is a flow diagram illustrating another example EDS process in accordance with at least one embodiment of the present disclosure.

FIGS. 4 and 5 illustrate example implementations of the EDS process in the context of the hardware configuration 200 of FIGS. 2 and 3. In particular, the EDS process 400 of FIG. 4 illustrates an example EDS process whereby the texture is rotated based on determined interim head rotation and then the optical and chromatic distortions are applied to the resulting rotated texture, whereas in the EDS process 500 of FIG. 5, the texture is optically distorted during the rendering process, the resulting distorted texture is "undistorted," rotation-transformed, and then "re-distorted." As explained further below, the EDS process 500 reduces the bandwidth requirements between the application processor 204 and the compositor 224 compared to the EDS process 400 by having the application processor 204 predistort the texture and thus eliminates the need for any margin above the display resolution in the texture, but at the expense of additional computations, more memory accesses, and a loss in quality due to additional sampling steps.

Referring now to FIG. 4, the EDS process 400 commences with the initiation of the display system 100 in preparation for the rendering and display of AR or VR content. As noted above, because the application hardware 122 and the EDS display hardware 124 may use separate gyroscopes, the initialization process can include, at block 402, the sensor hub 208 or other component of the display system calibrating the gyroscopes 218, 232 individually as well as with respect to each other. In the event that the same gyroscope is used to generate two different sample stream of different sample rates for implementation as the gyroscopes 218, 232, the initialization process may include, for example, configuring the sampling rates for each of these respective sample streams. Further, at block 404, the display system 100 initializes various parameters utilized by the compositor 224 during the display frame generation process and stores these parameters to the configuration store 302 of the compositor 224.

To illustrate, as described above, the eyepiece lenses 116, 118 of the HMD 102 introduce optical and chromatic distortions into the displayed images that may be counteracted through corrective distortion before they are displayed. Typically, these correction processes are non-linear distortion processes and thus cannot be readily implemented via application of a transform matrix. Instead, the transform from a textured space to the distorted screen space may be implemented via, for example, a 2D look up table (LUT) representing a discretization of the distortion transform, with each eye assigned a separate 2D LUT, such as 2D LUTs 316, 318 (FIG. 3) for the left eye and the right eye, respectively. Each LUT entry contains three pairs of texture coordinates (one for each color so as to enable chromatic aberration correction). To reduce storage requirements, each 2D LUT may be implemented at a relatively low resolution relative to the display resolution. For example, each 2D LUT may have $\frac{1}{10}$th of the resolution of the displays 112, 114, and thus for a display resolution of 1440×1440, the 2D LUTs 316, 318 each may have 144×144 LUT entries. In such instances, linear interpolation between the LUT entries around a given pixel location may be used for the distortion transformation.

The parameters initialized and stored in the configuration store 302 at block 404 also include a pair of projection matrices 320, 322 (FIG. 3), one each for the left eye and right eye, respectively, and which represent the texture-from-eye transform for the corresponding eye. In the examples described herein, each of the projection matrices 320, 322 is implemented as a corresponding 4×4 matrix. The parameters initialized and stored at the configuration store 302 also may include other configuration settings 323, such as diopter settings or interpupillary distance (IPD) settings. In at least one embodiment, the initialization process of block 404 may be repeated in response to any optical parameter changes of the HMD 102 or the display system 100 at large that may impact the configuration of the 2D LUTs 316, 318 or the projection parameter matrices 320, 322.

With initialization complete, the EDS process 400 then splits into two sub-processes 406, 408 that operate in parallel, with sub-process 406 performed by the application hardware 122 and sub-process 408 performed by the EDS display hardware 124. The sub-process 406 represents the process of rendering a pair of textures that represent a 3D scene from the perspective of the current pose of the user's head 104/HMD 102. Accordingly, an iteration of the sub-process 406 initiates at block 410 with the application processor 204 accessing the inertial sensors of the application IMU 210 to determine the current head pose and rotation. This typically includes obtaining one or more sensor samples from the gyroscope 218 to determine the current head rotation. At block 412, the application processor 204 renders a 3D scene (as specified by the VR/AR application 202) to a pair of textures 324, 325 (FIG. 3), one for each eye, based on the head pose and rotation determined at block 410. In at least one embodiment, the application processor 204 uses the head rotation determined at 410 and predicts a change in head rotation from the time associated with the head rotation to some specified point in time in the future. As noted above, application processor 204 renders textures for storage in the display memory 234. In the EDS process 400, the rendered textures 324, 325 are undistorted (that is, have not yet been correctively pre-distorted for optical and chromatic aberration correction), and thus the size of the rendered textures 324, 325 is a function of the resolution of the displays 112, 114 and various optical parameters (which may vary at run time, such as when a user performs a diopter adjustment or adjusts the IPD) and is somewhat larger than the resolution of the displays 112, 114. To illustrate, for a display resolution of 1440×1440 pixels, it may be appropriate to include a margin of, for example, 540 pixels in each dimension, and thus render undistorted textures 324, 325 having a pixel resolution of 2000×2000.

At block 414, the application processor 204 sends to the compositor 224 a representation of the head rotation determined at block 410 and a representation of the timestamp associated with the last gyroscope sensor sample used to determine this head rotation. In at least one embodiment, the representation of the head rotation comprises a quaternion (denoted "q1"). In particular, the quaternion q1 may represent a rotation delta from the rotation detected from the last gyroscope sensor sample to a predicted head rotation at some future point in time. In other embodiments, the head rotation (or predicted rotation delta) may be represented as, for example, an orthogonal matrix. The provision of the quaternion q1 and the timestamp serves to signal to the EDS display hardware 124 the head rotation used by the application processor 204 to render the pair of textures 324, 325 as well as the point in time at which the head rotation was determined or otherwise obtained. With the pair of textures 324, 325 rendered and the head rotation corresponding timestamp signaled, the flow returns to block 410 and the next iteration of the sub-process 406. As noted above, the texture rendering process is performed at a rate of X texture renderings/second, and thus iterations of the sub-process 406 are performed at the rate of X iterations/second.

Concurrent with the texture rendering operations of sub-process 406, the EDS display hardware 124 performs iterations of the sub-process 408 to generate and display image frames from the most recently rendered pair of textures 324, 325. Accordingly, the rendering of a new pair of textures 324, 325 by an iteration of sub-process 406 triggers a corresponding iteration of the sub-process 408. Initially, at block 416 the EDS display hardware 124 notes the generation of the most recent pair of textures 324, 325 and the interim rotation calculation component 312 receives the quaternion q1 representing the corresponding head rotation from the application processor 204.

As noted above, the display system 100 may employ an EDS process on a slice-by-slice basis, whereby each slice represents one or more scan lines/pixel rows of a display frame. A slice thus may be a subset of the scan lines of a display frame, or in some instances the display frame may be considered to constitute a large single slice. Thus, to facilitate description of the following process, the term "slice" may refer to a subset of scan lines of a display frame in implementations in which the slice is implemented in this manner, or "slice" may refer to an entire display frame in implementations whereby the EDS process is performed on a frame-by-frame basis.

In preparation for display of a slice of a display frame based on the most recent texture, at block 418 the interim rotation calculation module 312 obtains an updated head rotation (that is, a current measure of the head rotation of the user or the HMD 102). In at least one embodiment, the updated head rotation is provided by the integrator component 304, which is coupled to the gyroscope 232 of the EDS IMU 226. The integrator component 304 includes a sliding window buffer 328 (FIG. 3) to store the k most recent gyroscope sensor samples 328 (FIG. 3) from the gyroscope 232, as well as a timestamp associated with a time of receipt or generation of the corresponding gyroscope sample 328, the timestamp synchronized to the clock reference CLK. Accordingly, to obtain an updated head rotation, the interim rotation calculation component 312 provides the timestamp associated with the quaternion q1 supplied by the application processor 204 to the integrator component 304 at block 414, and the integrator component 304 operates to forward integrate the gyroscope samples 325 in the sliding window buffer 326 identified as having a timestamp that is equal to, or subsequent to, the timestamp supplied by the application processor 204 so as to obtain a quaternion (denoted "q2" in FIGS. 3 and 4) or other representation of a head rotation from that specified point in time as measured by the gyroscope 232. The quaternion q2 supplied by the integrator component 304 may comprise a representation of a rotation delta from the point of time represented by the timestamp to the current point in time. In such instances, it will be appreciated that the quaternion q1 supplied by the application processor 204 represents a predicted change in rotation that is to occur between time A and time I, and the quaternion q2 represents an estimated or measured change in rotation that occurred between time A and time J, where I and J may be different points in time.

At block 420, the homography rotation component 314 determines a homography rotation between the initial head rotation determined by the application processor 204 and the updated head rotation determined at block 418. That is, the homography rotation component 314 determines a homography rotation transform that represents the interim head rotation between the head rotation used by the application processor 204 to render the corresponding texture and the recent head rotation measured by the integrator component 304. More particularly, as noted above, the quaternion q1 supplied by the application processor 204 may comprise a prediction of a rotation delta from time A represented by the supplied time stamp to a future time I, whereas the quaternion q2 supplied by the integrator component 304 may comprise a representation of a rotation delta from time A to the current time J. As I and J may be different points in time, the predicted head rotation that served as the basis for rendering the pair of textures 324, 325 may not coincide with the head rotation that has actually occurred up to the present point in time, and thus the homography rotation determined by the homography rotation component 314 is used to correct or otherwise compensate for this interim head rotation (that is, the difference between the head rotation used to render the texture and the actual head rotation that has occurred up to the current point in time).

Accordingly, in at least one embodiment, the interim rotation calculation component 312 determines a quaternion (denoted "Δq") that represents the head rotation that has occurred in the interim since the rendering of the pair of textures was initiated by the application processor 204; that is, the quaternion Δq is determined as the difference between the quaternions q1 and q2 (Δq=q1−q2), or the difference between the rotation amount determined by the application processor 204 and the rotation amount determined by the compositor 224. The homography rotation component 314 then accesses the projection parameter matrices 318, 320 and computes a pair of homography rotation transforms, one for each eye, using the quaternion Δq and the projection parameter matrix for the corresponding eye (e.g., a 4×4 matrices based on the 4×4 matrices 318, 320). To illustrate, this computation may be represented by the following pseudocode:

texture_old_from_texture_new_matrix=
texture_from_eye_matrix*
eye_old_from_eye_new_matrix*
eye_from_texture_matrix where "texture_old_from_texture_new_matrix" is the homography rotation matrix that transforms from the new texture space to the old texture space, "texture_from_eye_matrix" is the projection matrix, "eye_old_from_eye_new_matrix" is the rotation matrix obtained by converting the quaternion Δq to a 4×4 matrix, and "eye_from_texture_matrix" is the inverse of the projection matrix.

At block 422, the compositor 224 applies each of the pair of homography rotation transforms determined at block 420 to the selected slice of the corresponding texture so as to rotate the slice in view of the interim head rotation, and at block 424 the compositor 224 applies one or both of an optical distortion correction and a chromatic aberration correction to the rotated slice As a homography rotation is a linear transform, the homography rotation can be applied to the 2D LUTs used for the optical/chromatic aberration correction process, and the resulting modified 2D LUTs then may be applied to the corresponding slice. That is, the compensatory distortion added to compensate for lens-induced optical and chromatic distortions itself may be rotated, and this rotated compensatory distortion then applied to the texture so as to both rotate the texture and apply the appropriate corrective distortion at the same time.

Thus, in the embodiment depicted in FIG. 4, the processes of blocks 422 and 424 may be implemented by the homography rotation component 314, at block 423, accessing the 2D LUTs 316, 318 from the configuration store 302 and applying the homography rotation transform for the left eye to the portion of the 2D LUT 316 that corresponds to the current slice to generate a warped 2D LUT portion 330 (FIG. 3) and applying the homography rotation transform for the right eye to the portion of the 2D LUT 318 that corresponds to the current slice to generate a warped 2D LUT portion 332 (FIG. 3). Thereafter, the texture warp component 310 applies, at block 425, the warped 2D LUTs portions 330, 332 to the portions of the textures 324, 325, respectively, that are associated with the current slice so as to generate respective rotation-warped and distorted slices for each of the left eye and right eye display frame. As noted above, the 2D LUTs used for the optical/chromatic correction process may have a lower resolution than the corresponding display frame, and thus the texture warp component 310 bi-linearly interpolates between texture coordinates (LUT entries) of the corresponding warped 2D LUT and samples the corresponding texture three times (once for each color) with bi-linear filtering to compute the final pixel color, which is then scanned out to the corresponding display for use in lighting the corresponding pixel position of the display.

As described above, in some embodiments the compositor 224 processes each texture on a slice-by-slice basis, with each slice being rotation warped based on an updated head rotation quaternion for the slice. However, in some implementations, this process may introduce shearing artifacts within a slice. Accordingly, in some embodiments, the compositor 224 may employ a shear correction process whereby the compositor 224 predicts the head rotation quaternion for the time that the leading edge of the slice (that is, the first line in the slice) is displayed and the head rotation quaternion for the time that the end edge of the slice (that is, the last line of the slice) is displayed, and linearly interpolating head rotations between these two predicted rotations across the lines of the slice. That is, each successive line is rotation warped with an incremental adjustment to the previous line's head rotation based on this linear interpolation between the two estimated head rotations. This has the effect of smoothing the head rotation warping within each slice. The processing of each slice of a texture sequentially also may introduce tearing artifacts between successive slices. Accordingly, in some embodiments, the compositor 224 also may employ a tear correction process whereby the compositor 224 uses the head rotation quaternion estimated for the end edge of the previous slice (as described above) as the head rotation quaternion for the leading edge of the next slice (while continuing to employ the linear interpolation between this head rotation quaternion and the head rotation quaternion estimated for the end edge of the next slice), and thereby smoothing rotation transitions between slices.

In other embodiments, the homography rotation component 314 provides the pair of homography rotation transforms to the texture warp component 310, which first applies the homography rotation transforms to the original textures to generate rotation-warped textures, and then performs a separate optical/chromatic correction process using the original 2D LUTs 316, 318 to generate a corresponding distorted, rotation-warped slice for each of the left eye display frame and the right eye display frame. In either approach, at block 426 each of the resulting rotation-warped, distorted slices is scanned out to the corresponding one of the displays 112, 114 and displayed to the corresponding eye of the user. Although FIG. 4 illustrates the scan out process of block 426 as occurring after the rotation/distortion processes for a slice has completed, in some implementations the rotation warping and distortion process and the scan out process for a slice may occur concurrently. In this approach, after the rotation-warp/distortion processing of a scan line of the slice has completed, the scan line may be scanned out to the corresponding display while the rotation-warp/distortion processing begins for the next line.

With the rotation-warping and optical/chromatic correction processes completed for the slice, the sub-process 408 returns to block 418 and initiates another iteration for the next slice of the display frame (or the next display frame if the previous slice was the last slice of the display frame). As noted above, the EDS display hardware 124 operates to scan out display frames at a frame rate Y, where Y may be significantly higher than the texture rendering rate X of the application hardware 122. Thus, through iterations of the sub-process 408, the EDS display hardware 124 may generate and display multiple display frames for each texture pair rendered by the application hardware 122. However, as each display frame so generated is rotated from the original perspective represented by the texture pair based on a corresponding updated head rotation, each displayed frame presents a perspective of the scene that more closely adheres to the user's perceived perspective, and thus serves to mitigate user disorientation. Moreover, because the process of generating display frames is somewhat decoupled from the texture rendering process, the display system 100 is more resilient to dropped frames by the application hardware 122.

Referring now to the EDS process 500 of FIG. 5, this process commences with the initiation of the display system 100 in preparation for the rendering and display of AR or VR content, which may include the calibration and synchronization of the gyroscopes 218, 232 at block 502 and the initialization of parameters utilized by the compositor 224 at block 505, as similarly discussed above with reference to blocks 402 and 404 of the EDS process 400. However, in addition to initializing the LUTs 316, 318 and the pair of projection parameter matrices 320, 322, the initialization process of block 502 further may include the initialization of a 2D LUT (not shown) that is used for "undistorting" a distorted texture, as described in greater detail below. However, this undistortion LUT is used only to undistort an optically distorted texture, and thus each LUT entry of the undistortion LUT has only one texture coordinate, compared to the three texture coordinates per LUT entry for the LUTs 316, 318.

After initialization, the EDS process 500 splits into two sub-processes 506, 508 that operate concurrently, with sub-process 506 performed by the application hardware 122 and sub-process 508 performed by the EDS display hardware 124. The sub-process 506 corresponds to the sub-process 406 of the EDS process 400 and thus represents the process of rendering a pair of textures that represent a 3D scene from the perspective of the current pose and rotation of the user's head 104/HMD 102. Accordingly, an iteration of the sub-process 506 initiates at block 510 with the application processor 204 determining the current head pose and rotation and rendering, at block 512, a pair of textures based on the current head pose and rotation as similarly discussed above with respect to blocks 410, 412. However, in the EDS process 500, the sub-process 506 includes the additional process of applying an optical distortion correction process to the rendered texture pairs at block 512 to generate the pair of textures 324, 325. Thus, in the embodiment of FIG. 5, the textures 324, 325 are pre-distorted to compensate for optical aberrations subsequently introduced by the eyepiece lenses 116, 118. As the textures 324, 325 are pre-distorted by the application processor, the distorted textures may be rendered at the resolution of the displays 112, 114 and no margin is required. To illustrate, as explained in an example above, for a display resolution of 1440×1440 pixels, the textures 324, 325 rendered without distortion may require a pixel resolution of 2000×2000, or 4,000,000 pixels. However, because no margin is required if the texture is pre-distorted, for the same display resolution the textures 324, 325 rendered with distortion would only require a pixel resolution of 1440× 1440, or 2,073,600 pixels. As such, the process of pre-distorting the textures 324, 325 at block 513 results in a pair of textures that requires more than 40% less storage space than the undistorted texture approach of the EDS process 400. The sub-process 506 further includes the process, at block 514, of sending the quaternion q1 representative of the head rotation (or the head rotation delta) and the corresponding timestamp to the compositor 224, as similarly discussed above with reference to block 414. The next iteration of the sub-process 506 is then performed for the next pair of textures at the texture render rate X Concurrent with the texture rendering operations of sub-process 506, the EDS display hardware 124 performs iterations of the sub-process 508 to generate and display image frames from the most recently rendered pair of textures 324, 325. Accordingly, the rendering of a new pair of textures 324, 325 by an iteration of sub-process 506 triggers a corresponding iteration of the sub-process 508. Initially, at block 516 the EDS display hardware 124 notes the generation of the most recent pair of textures 324, 325 and the interim rotation calculation component 312 receives the quaternion q1 representing the corresponding head rotation from the application processor 204.

Because the textures 324, 325 were pre-distorted at block 513, the textures 324, 325 should be "undistorted" before rotation warping. Accordingly, the sub-process 508 includes the additional process of undistorting the distorted textures 324, 325 at block 512. Accordingly, the texture warp component 310 may access the pair of undistort LUTs initialized at block 504, and apply each undistort LUT to the corresponding distorted texture to generate an undistorted texture. Thus, while the pre-distortion of the textures 324, 325 by the application processor 204 may reduce the size of the framebuffer used to store distorted textures compared to the undistorted textures 324, 325 of the EDS process 400, the process of pre-distorting and then undistorting requires additional memory accesses and computations by both the application processor 204 and the compositor 224.

With the textures 324, 325 returned to their undistorted form, the EDS process 500 commences with the process of rotation warping each slice, performing an optical and chromatic aberration correction process, and scanning out the resulting distorted, warped slice as described above with respect to blocks 418, 420, 422, 424, and 426 as described above for the EDS process 400.

Much of the inventive functionality and many of the inventive principles described above are well suited for implementation with or in integrated circuits (ICs) such as application specific ICs (ASICs). It is expected that one of ordinary skill, notwithstanding possibly significant effort and many design choices motivated by, for example, available time, current technology, and economic considerations, when guided by the concepts and principles disclosed herein will be readily capable of generating such ICs with minimal experimentation. Therefore, in the interest of brevity and minimization of any risk of obscuring the principles and concepts according to the present disclosure, further discussion of such software and ICs, if any, will be limited to the essentials with respect to the principles and concepts within the preferred embodiments.

In this document, relational terms such as first and second, and the like, may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element. The term "another", as used herein, is defined as at least a second or more. The terms "including" and/or "having", as used herein, are defined as comprising. The term "coupled", as used herein with reference to electro-optical technology, is defined as connected, although not necessarily directly, and not necessarily mechanically. The term "program", as used herein, is defined as a sequence of instructions designed for execution on a computer system. A "program", or "computer program", may include a subroutine, a function, a procedure, an object method, an object implementation, an executable application, an applet, a servlet, a source code, an object code, a shared library/dynamic load library and/or other sequence of instructions designed for execution on a computer system.

The specification and drawings should be considered as examples only, and the scope of the disclosure is accordingly intended to be limited only by the following claims and equivalents thereof. Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. The steps of the flowcharts depicted above can be in any order unless specified otherwise, and steps may be eliminated, repeated, and/or added, depending on the implementation. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. In a system with a head mounted display (HMD), a method comprising:
    determining, at a first time, a representation of a first head rotation of the HMD using a first inertial sensor sample stream;
    rendering, at an application processor of the system, a texture based on the first head rotation;
    determining, at a second time subsequent to the first time, a representation of a second head rotation of the HMD using a second inertial sensor sample stream different than the first inertial sensor sample stream;
    generating, at a compositor of the system, a rotated representation of the texture based on a difference between the first head rotation and the second head rotation;
    wherein determining the representation of the first head rotation comprises determining a first quaternion representative of a predicted change in rotation between the first time and a subsequent time based on the first inertial sensor sample stream;
    wherein determining the representation of the second head rotation comprises determining a second quaternion representative of a measured change in rotation between the first time and the second time based on the second inertial sensor sample stream; and wherein generating the rotated representation of the texture comprises:
   determining a homography rotation transform based on the difference between the predicted change in rotation and the measured change in rotation;
   applying the homography rotation transform to a look up table (LUT) representing a non-linear distortion transform to generate a warped LUT; and
   applying the warped LUT to the texture to generate a warped texture.

2. The method of claim 1, wherein:
determining the second quaternion representative of the measured change in rotation between the first time and the second time comprises:
   buffering, at the compositor, sensor samples from the second inertial sensor sample stream in a sliding window buffer, each buffered sensor sample having an associated timestamp;
   receiving, at the compositor, a timestamp associated with the first time;
   identifying one or more buffered sensor samples having a timestamp equal or subsequent to the received timestamp; and
   forward integrating the identified one or more buffered sensor samples to determine the measured change in rotation between the first time and the second time.

3. A system comprising:
a head mounted display (HMD);
at least one inertial sensor;
an application processor coupled to the at least one inertial sensor, the application processor to render textures at a first rate, wherein for each texture the application processor is to determine a corresponding head rotation of the HMD from a first sample stream from the at least one inertial sensor and to render the texture based on the corresponding head rotation;
a compositor coupled to the at least one inertial sensor and the application processor, the compositor to generate display frames at a second rate at least equal to the first rate, wherein for each display frame the compositor is to determine an updated head rotation from a second sample stream from the at least one inertial sensor and to generate the display frame as a rotated representation of a corresponding texture based on a difference between the corresponding head rotation of the texture and the updated head rotation;
wherein the application processor is to determine the corresponding head rotation as a first quaternion representative of a predicted change in rotation between a first time and a subsequent time based on the first sample stream; and
wherein the compositor is to determine the updated head rotation as a second quaternion representative of a measured change in rotation between the first time and a subsequent time associated with the display frame based on the second sample stream and to generate the rotated representation of the texture based on the difference between the predicted change in rotation and the measured change in rotation, and wherein the compositor comprises:
   a configuration store to store a look up table (LUT) representing a non-linear distortion transform;
   a homography rotation component to determine a homography rotation transform based on the difference between the predicted change in rotation and the measured change in rotation and to apply the homography rotation transform to the LUT to generate a warped LUT; and
   a texture warp component to apply the warped LUT to the texture to generate a warped texture.

4. The system of claim 3, wherein the compositor comprises:
   an integrator component to receive the second sample stream and having a sliding window buffer to buffer sensor samples from the second sample stream along with an associated timestamp, the integrator component to identify one or more buffered sensor samples having a timestamp equal or subsequent to a timestamp associated with a sensor sample of the first sample stream associated with the first time and to forward integrate the identified one or more buffered sensor samples to determine the measured change in rotation between the first time and the subsequent time associated with the display frame.

5. In a system having a head mounted display (HMD), a method comprising:
   rendering, at an application processor, a texture based on an initial head rotation of the HMD determined from an inertial sensor;
   for each slice of a sequence of slices representing a display frame:
      determining, at a compositor, a corresponding updated head rotation from an inertial sensor;
      determining, at the compositor, a homography rotation transform for the slice based on a difference between the initial head rotation and the corresponding updated head rotation; and
      applying, at the compositor, the homography rotation transform to a portion of the texture corresponding to the slice to generate a warped slice;
   scanning out the warped slice for display at the HMD;
   wherein determining the initial head rotation comprises determining a first quaternion representative of a predicted change in rotation between a first time and a subsequent time:
   wherein determining the updated head rotation comprises determining a second quaternion representative of a measured change in rotation between the first time and a second time associated with the slice, wherein determining the second quaternion comprises:
      buffering, at the compositor, sensor samples from an inertial sensor in a sliding window buffer, each buffered sensor sample having an associated timestamp;
      receiving, at the compositor, a timestamp associated with the initial head rotation;
      identifying one or more buffered sensor samples having a timestamp equal or subsequent to the received timestamp; and
      forward integrating the identified one or more buffered sensor samples to determine the second quaternion; and
   wherein generating the homography rotation transform comprises generating the homography rotation transform based on a difference between the first quaternion and the second quaternion.

6. The method of claim 5, wherein applying the homography rotation transform to a portion of the texture corresponding to the slice to generate a warped slice comprises:
   accessing a look up table (LUT) representing a non-linear distortion transform;

applying the homography rotation transform to a portion of the LUT corresponding to the slice to generate a warped LUT portion; and applying the warped LUT portion to the portion of the texture to generate the warped slice.

7. The method of claim 6, further comprising:

determining the initial head rotation based on a first gyroscope sample stream having a first sampling frequency; and wherein determining the corresponding updated head rotation comprises determining the corresponding updated head rotation based on a second gyroscope sample stream having a second sampling frequency greater than the first sampling frequency.

8. The method of claim 5, further comprising:

determining the initial head rotation based on a first gyroscope sample stream having a first sampling frequency; and wherein determining the corresponding updated head rotation comprises determining the corresponding updated head rotation based on a second gyroscope sample stream having a second sampling frequency greater than the first sampling frequency.

\* \* \* \* \*